United States Patent

[11] 3,567,952

| [72] | Inventor | George D. Doland |
| | | 1103 Westgate Road, Mount Prospect, Ill. 60056 |
| [21] | Appl. No. | 527,393 |
| [22] | Filed | Feb. 3, 1966 |
| [45] | Patented | Mar. 2, 1971 |

[54] PROCESS FOR ELECTRICAL POWER GENERATION AND WATER PURIFICATION SYSTEM
3 Claims, 1 Drawing Fig.

[52] U.S. Cl. ................................................ 290/1
[51] Int. Cl. .................................................. C02b 1/06
[50] Field of Search .......................................... 290/1, 2; - 290/(Inquired); 60/67 (Inquired); 202/235; 203/22—26, 100

[56] References Cited
UNITED STATES PATENTS

| 2,707,239 | 4/1955 | Riehl | 290/2 |
| 3,076,096 | 1/1963 | Bachmann | 290/2X |
| 3,243,359 | 3/1966 | Schmidt | 202/235X |

OTHER REFERENCES
Standard Handbook for Electrical Engineers, ninth edition, 1957 by A. E. Knowlton, Sec. 10, pp 942— 943.

*Primary Examiner*—Oris L. Rader
*Assistant Examiner*—W. E. Duncanson, Jr.

ABSTRACT: The invention described herein relates to an improved water and power plant system. The system consists of a means for producing steam which is used for a steam turbine prime mover driving an electrical generator. Steam is extracted from the steam expansion cycle to operate the water plant. High efficiency is achieved by operating the turbine at pressures and temperatures similar to a power-only plant. Thermal economy for the water plant is gained by using the exhaust steam of the turbine to preheat the water plant feed. Additional thermal economy is gained by recovering energy from the water plant discharged concentrated impure water and product water.

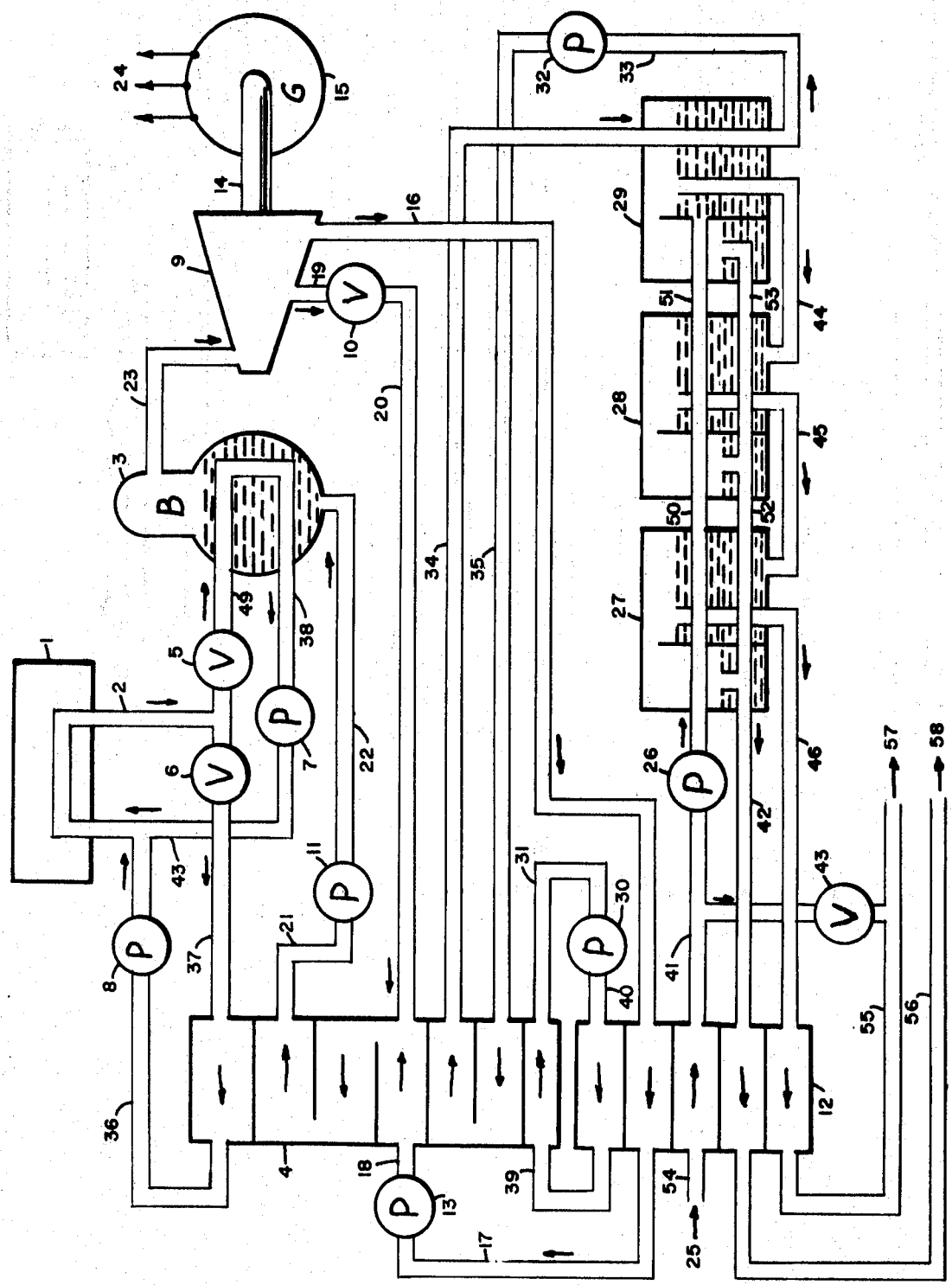

PROCESS FOR ELECTRICAL POWER GENERATION AND WATER PURIFICATION SYSTEM

The present invention relates to improvements in the process for electrical power generation and water purification as a single integrated system.

Electrical power generating systems have been in use for many years but recent advances in technology have resulted in combined systems which not only produce electrical power but are used for the purification of sea water for human consumption. This invention employs a novel approach so as to result in a greater product yield when sanitary district water is purified, lower costs, increased efficiency, and independent control of the amount of electrical power produced and pure water.

As an introduction to the invention, conventional systems will be described in terms of the major essential elements. The first essential element is a fuel which provides a source of energy for the electrical power generation and also water purification in a combined system. This fuel may be coal, oil, gas, or any of many different nuclear fuels. Through combustion or nuclear reaction, the fuel provides thermal energy. In the invention to be described, any of these fuels may be used with appropriate system modifications.

The second essential element for any of the systems is a boiler which converts heat from the fuel to thermal energy of steam which may be saturated or superheated as desired or required for efficient generation of electrical power. The third essential element for any of the systems is a steam turbine which converts the thermal energy of the steam to mechanical power by rotating the turbine shaft under load. The turbine is usually provided with one or more bleed points in an efficient system as well as the main exhaust port.

The fourth essential element for any system, of the types being described, is the electrical power generator. This electrical generator may be a direct current generator, alternating current generator, or a combination. The electrical power produced may be used to power motors and control circuits as well as being a major product of the system. Generally, the main output is polyphase alternating current with direct current generators to provide external excitation and a portion of the electrical power is used for electrical equipment within the system.

In a electrical power generation system, the fifth major essential item is a condenser which condenses the steam from the turbine, the third essential item discussed. In a power only system, the choice of type of condenser design is at the option of the engineer. The condenser may use cooling towers, water or air cooled. In a conventional dual purpose system, the exhaust steam from the turbine is at an elevated temperature. It is not condensed but is used as a source of heat or thermal energy for distillation of the impure water. When the turbine exhaust temperature is higher than optimum to provide energy for distillation of water, there is a loss in efficiency. In the invention to be described, this problem is avoided and the turbine is operated under conditions for maximum efficiency. In the dual purpose system of conventional design, the exhaust steam is condensed either during or after the distillation process.

In the large high efficiency systems, the next major element is the feedwater heater. The feedwater heater uses steam from bleed points on the turbine to elevate the temperature of the water prior to entry into the main boiler. The same approach is used for conventional power only or dual purpose systems.

All systems require pipes, valves, pumps, and control circuits to control the operation of the system and obtain the desired output with a maximum of efficiency. The dual purpose system arrangement which existed prior to the invention to be described in detail is such that the amount of distilled water produced was directly dependent upon the electrical power produced.

A primary feature of this invention is the use of heat exchangers in a new and better arrangement so as to permit operation of the turbine at optimum conditions for the electrical power produced, make the production of water purification independent of the electrical power generated, and to transfer the thermal energy so as to provide water purification under more optimum conditions. The invention will be described in detain with reference to the FIGURE which is a schematic plan drawing showing the essential elements of the improvement in the process for electrical power generation and water purification.

Referring to the FIGURE, the energy source 1 is a nuclear reactor although other energy sources may be used as described previously. With a nuclear reactor power source, bleeder reactor functions may also be included. This block representing the energy source 1 includes the containment for a reactor melt-down accident and all controls normally associated with a nuclear reactor power source.

The nuclear reactor is cooled by an appropriate coolant material for the particular reactor design flowing in a closed fluid flow pipe system of two loops. One loop consists of pipe section 2, valve 5, pipe section 49, the boiler 3, pipe section 38, pump 7 and pipe section 48. The second loop consists of pipe section 2, valve 6, pipe section 37, high temperature heat exchanger 4, pipe section 36, pump 8, and pipe section 48 back to the energy source 1. It will be noted that pipe section 2 and pipe section 48 have portions in common with both or the fluid flow loops described. This arrangement reduces the number of pipes through the reactor containment wall. These loops could be entirely separate if desired.

Valve 5 with pump 7 controls the flow or thermal energy of the reactor coolant material to the boiler. Valve 6 with pump 8 controls the flow of thermal energy of the reactor coolant material to the high temperature heat exchanger 4. Both loops of coolant material flow have motors to drive the pumps and auxiliary control circuits not specifically shown.

The energy of the reactor coolant material fed to the boiler 3 generates either saturated or superheated steam to drive the turbine 9. The steam leaves the boiler 3 through pipe section 23 to reach the turbine 9. These elements are a part of a closed system of multiple loops which include the high temperature heat exchanger 4 and the low temperature heat exchanger 12. Portions of this closed piping system is operated at very high temperatures and pressures while in other portions the temperature is near 90° F. and a gauge would indicate a vacuum. Portions of the piping system contain steam while in other parts the heat has been extracted and steam has been condensed to water.

The main exhaust from the turbine 9 is steam at a low temperature optimum for the turbine operation, which leaves the turbine 9 through pipe section 16. This steam looses thermal energy in the low temperature heat exchanger 12 causing the steam to condense. Therefore, the low temperature heat exchanger 12 acts as a condenser. The lost heat from the steam is absorbed by the water 25 which enter the low temperature heat exchanger 12 through pipe section 54 and discharges through pipe section 41. The steam which entered the low temperature heat exchanger via pipe 16 leaves the low temperature heat exchanger 12 via pipe section 17 as water. This water is pumped by pump 13 and enters the high temperature heat exchanger via pipe 18. This water is heated in the high temperature heat exchanger 4 and leaves the unit via pipe 21 where it is pumped by pump 11 and enters the boiler 3 via pipe 22 as feedwater.

Pipe 19 represents a pipe from each bleed point on the turbine 9 although only one is shown. Valve 10 also represents a control valve in each pipe represented by pipe 19. Similarly pipe 20 represents a pipe from each of the valves represented as valve 10. These pipes 20 carry steam to the high temperature heat exchanger 4 which acts as a feedwater heater. The feedwater which enters the boiler 3 via pipe 22 is optimum for the boiler operation. Also associated with this closed system is a makeup water supply, safety or relief valves, and controls which are normally associated with an electrical power generating system employing a boiler, steam turbine, condenser, and feedwater heater.

Thermal energy is also extracted from the high temperature heat exchange unit 4 which leaves the unit via pipe 34 to feed thermal energy to the high temperature distillation unit 29. Either steam or water may be used as desired by the engineer. Thermal energy is extracted from the steam or water in the high temperature distillation unit 29 and the steam or water leaves the unit at a lower temperature via pipe 33, is pumped by pump 32 back to the high temperature heat exchanger 4 via pipe 35 to be reheated. The thermal energy supplied by this closed loop is only sufficient to raise the temperature of the water to by distilled in the high temperature distillation unit 29 a few degrees.

The last close loop pipe system from the high temperature heat exchanger 4 includes pipe 31, pump 30, pipe 40, the low temperature heat exchanger 12 and pipe 39. The purpose of an intermediate closed loop is to supply thermal energy from the high temperature heat exchanger 4 to the low temperature heat exchanger as required. Also associated with this closed loop are makeup water supplies, motors to drive the pumps, and appropriate control circuits. The above statement also applies to the loop described in the preceeding paragraph.

The water 25 which enters the low temperature heat exchanger via pipe 54 is the impure water to be purified. This impure water may be sea water, water from a sanitary district, river water or other. It must be supplied at a pressure sufficient to pass through the low temperature heat exchanger 12, have sufficient volume to condense the turbine exhaust steam received by the low temperature heat exchanger 12 via pipe 16 and be at a temperature which is not too high for the condensation process. The cooling water of a power only system meets all the requirements except an additional pump not shown may be required. The amount of pure water obtainable is of course limited by the supply of impure water available and theoretical yield for the purification process.

The preheated impure water leaves the low temperature heat exchanger 12 via pipe 41. The excess water above that to be purified, passes through valve 43 and is discharged as impure water 57. The impure water to be purified is pumped through the low temperature distillation unit 27, intermediate distillation units 28 to the high temperature distillation unit 29. When the impure water from pump 26 enters the low temperature distillation unit 27 via pipe 47 it is used to cause condensation of the water vapor in the distillation unit by absorbing thermal energy raising the temperature of the impure water. The impure water leaves the low temperature distillation unit via pipe section 50 at the temperature of the water being distilled in the low temperature distillation unit.

The impure water then enters an intermediate temperature distillation unit via pipe 50 and the process of condensation of water vapor while heating the impure water is repeated again resulting in a higher an intermediate There may be any number of intermediate temperature distillation units each operating at a higher temperature. The last distillation unit in the chain is the high temperature distillation unit 29. The impure water is fed to the high temperature distillation unit 29 via pipe 51 where the impure water again causes condensation of the water vapor in the distillation unit. In the high temperature distillation unit 29, the impure water is discharged to be distilled. The thermal energy for distillation in this unit is supplied to the high temperature distillation unit from the high temperature heat exchanger 4 via pipe 34 as described previously.

The distilled water in the high temperature distillation unit 29 is collected and fed through the intermediate temperature distillation units. Since the flow of the distilled water is from a high temperature unit to a lower temperature unit, thermal energy is given up in each unit raising the temperature of the impure water which travels from unit to unit in the opposite direction as described previously. In FIG. 1, the distilled water flows from the high temperature distillation unit 29 to an intermediate temperature distillation unit 28 through pipe 53. The distilled water from an intermediate temperature distillation unit 28 to the low temperature distillation unit through pipe 52. The distilled water leaves the low temperature distillation unit 27 via pipe 42 which contains all the purified water. This water is at an elevated temperature and additional heat is removed in the low temperature heat exchanger 12. The distilled water is the purified product water 58 discharged from the low temperature heat exchanger 12 via pipe 56.

More impure water is fed to the high temperature distillation unit than is purified or distilled in the unit. The excess impure water leaves the high temperature distillation unit 29 via pipe 44 and is fed to the intermediate temperature distillation unit 28 for purification. The flow is from a high temperature unit to a lower temperature unit making thermal energy available. Distillation is forced by operating the lower temperature distillation unit as a lower pressure. There is an excess of impure water supplied to the intermediate temperature distillation unit via pipe 44 than is purified. The excess leaves the intermediate temperature distillation unit via pipe 45 and enters the low temperature distillation unit for purification. In the low temperature distillation unit 27, there is again an excess of impure water supplied than purified. The excess leaves the low temperature distillation unit 27 via pipe 46 and is fed to the low temperature heat exchanger 12.

The impure water leaving the low temperature distillation unit 27 and entering the low temperature heat exchanger 12 is at an elevated temperature. Additional heat is transferred to the impure water 25 entering the system through pipe 54. The cooled impure water is discharged from the low temperature heat exchanger 12 via pipe 55.

The entire description of the distillation units 27, 28, 29 is based upon current flash distillation units and does not in itself constitute a novel feature. Any number of intermediate stages may be used based upon the temperature of operation of the high temperature stage 29, the low temperature stage 27 and a satisfactory temperature differential between stages. At low temperatures, the pressure is below atmospheric pressure requiring vacuum pumps or equivalent. This equipment is not shown on the diagram, FIG. 1. It is equipment normally associated with flash distillation units. This description is not to limit the design of the distillation units as for operation at the high temperatures and pressures other current types may be used. Because of operation below atmospheric pressures in the low temperature distillation unit 27 a pump is required in pipe 42 or pipe 56 and in pipe 46 or pipe 55. The exact position is at the option of the engineer for the system.

In this water purification system, solid material must be removed before entering the system. In addition, it is not possible to obtain 100 percent yield. The impurities must remain dissolved or suspended in the concentrated impure water discharged 57. This is also a requirement for water purification systems using distillation prior to this invention.

To operate the system to generate electrical power only, valve 5 is opened, valve 6 closed, pump 7 turned on, pump 8 turned off, valve 10 adjusted for efficient operation, pump 11 turned on, pump 13 turned on, pump 26 turned off, pump 30 turned off, pump 32 turned off, and valve 43 opened. Heat from the energy source 1 is transferred by the reactor coolant, via the pipes connecting the energy source 1 to the boiler 3, to the boiler 3. Steam is generated in the boiler 3 which operates the turbine 9. The turbine drive shaft 14 drives the electrical generator 15 and produces electrical power output 24. The exhaust steam in pipe 16 is fed to the low temperature heat exchanger 12 where it is condensed by impure water 25 flowing through the low temperature heat exchanger 12, the impure water being discharged through pipe 41, and valve 43 and output as impure water 57. The low temperature heat exchanger functions as a condenser in this type of operation. The condensed water is pumped by pump 13 to the high temperature heat exchanger 4. The bleedoff steam in pipe 20 is used to heat the condensed steam or water and is pumped by pump 11 back to the boiler. In this type of operation, the high temperature heat exchanger 4 functions as a feedwater heater. If the efficiency could be improved by raising the feedwater temperature, valve 6 could be opened and pump 8 operated to supply additional thermal energy. Alternately, if efficiency could be improved or if the feedwater were too hot, pump 30 could be operated to transfer heat from the high temperature heat exchanger 4 to the low temperature heat exchanger 12 and then to the impure water 25 entering through pipe 54. This described operation of the equipment as a power only system showing it is independent of water purification.

To operate the equipment to purify water without the generation of electrical power, turn off valve 5, turn off pump 7, open valve 6, turn on pump 8, shut valve 10, turn off pump 11, turn off pump 13, turn on pump 26, turn on pump 30, turn on pump 32, and shut valve 43. Thermal energy from the energy source 1 will now be transferred by the nuclear coolant material via the piping to the high temperature heat exchanger 4. Some of the thermal energy will be transferred through pipe 34 to the high temperature distillation unit. A portion of the thermal energy of the high temperature heat exchanger 4 will be transferred to the low temperature heat exchanger 12 by the operation of pump 30. The impure water 25 entering the low temperature heat exchanger 12 will be preheated to the desired temperature and pump 26 will pump the impure water through the various distillation units 27 and 28 to the high temperature distillation unit 29 where it will be further heated. Distillation will take place in the various distillation units 29, 28 and 27 as described in detail previously. After exchange of heat in the low temperature heat exchanger 12, the pure water 58 and residual impure water 57 will be discharged. This describes the operation of the equipment independent of electrical power generation.

This independent production of electrical power or water purification is not possible with conventional systems. In the usual mode of operation, both electrical power and water purification will be accomplished simultaneously. Adjustment of the valves and pumps will permit the production of the desired quantity of electrical power and pure water with maximum efficiency, and conservation of the fuel used.

With systems designed to produce electrical power, the heat lost in the condensing process is substantial. With dual purpose systems of conventional design, the temperature of the turbine exhaust steam is elevated resulting in a loss of turbine efficiency. Because of technical problems with feedwater temperatures above about 435°F., there is generally an excess of thermal energy available from the turbine bleed points than is required for feedwater heating. In the improved process of this invention, this thermal energy is effectively used for water purification. Thermal energy will be required for the high temperature heat exchanger 4 from the energy source 1 through pipe 37 when water purification is at a high level and power production is at a low level.

Having described the improved process in terms of the major system components and in terms of the operation for various modes, those experienced in the various fields such as heat transfer, power plant design, and related field will find obvious variations which incorporate the invention herein described. One such variation is the use of a multistage or multiple units to replace the high temperature heat exchanger 4. A similar arrangement could be used for the low temperature heat exchanger 12. A third variation is to incorporate the various stages of the multistage distillation unit into a single unit.

Having particularly described the system in terms of the element of the system and the operation of the system for various modes of operation, the improvements in the process for electrical power generation and water purification claimed are as follows:

I claim:

1. A water and power plant system consisting of a means for producing steam, at least one turbine prime mover for an electrical power generator, a means for heating power plant feedwater, a power plant exhaust steam condenser, a multistage distillation unit, and other equipment normally associated with water and power plant facilities; the equipment configured so that the power plant feedwater and steam do not mix with the water plant feed, product vapor or product water; steam from an interior portion of the steam expansion cycle being used to provide energy to the water plant as thermal energy is released as the steam condenses to power plant feedwater; and a means for preheating the water plant feed utilizing energy from the concentrated impure water discharged from the distillation unit.

2. A water and power plant system as described in claim 1 which also includes a means for recovering thermal energy from the exhaust steam of the turbine to preheat the water plant feed prior to entering the distillation unit.

3. A water and power plant system as described in claim 1 which also includes a means for recovering thermal energy from the product water to preheat the water plant feed prior to entering the distillation unit.